(12) United States Patent
Florez et al.

(10) Patent No.: US 10,931,659 B2
(45) Date of Patent: Feb. 23, 2021

(54) FEDERATED AUTHENTICATION FOR INFORMATION SHARING ARTIFICIAL INTELLIGENCE SYSTEMS

(71) Applicant: BANK OF AMERICA CORPORATION, Charlotte, NC (US)

(72) Inventors: Saul H. Florez, Bear, DE (US); Jisoo Lee, Cortlandt Manor, NY (US)

(73) Assignee: Bank of America Corporation, Charlotte, NC (US)

(*) Notice: Subject to any disclaimer, the term of this patent is extended or adjusted under 35 U.S.C. 154(b) by 265 days.

(21) Appl. No.: 16/112,439

(22) Filed: Aug. 24, 2018

(65) Prior Publication Data

US 2020/0067906 A1 Feb. 27, 2020

(51) Int. Cl.
*H04L 29/06* (2006.01)

(52) U.S. Cl.
CPC ...... *H04L 63/0815* (2013.01); *H04L 63/0884* (2013.01)

(58) Field of Classification Search
CPC ............. H04L 63/0815; H04L 63/0884; H04L 63/102; H04L 63/105; H04L 63/0853
See application file for complete search history.

(56) References Cited

U.S. PATENT DOCUMENTS

| | | | | |
|---|---|---|---|---|
| 7,314,169 B1* | 1/2008 | Jasper | ..................... | G06F 21/31 235/382 |
| 9,282,073 B1* | 3/2016 | Avital | ..................... | H04L 51/26 |
| 9,552,470 B2* | 1/2017 | Turgeman | ............... | G06F 3/041 |
| 10,452,993 B1* | 10/2019 | Hart | ........................ | G06F 16/13 |
| 10,798,238 B2* | 10/2020 | Mosenia | ............ | H04M 15/8033 |
| 2003/0065636 A1* | 4/2003 | Peyrelevade | .......... | A61B 5/445 706/62 |
| 2004/0059977 A1* | 3/2004 | Liau | ............... | G01R 31/318371 714/741 |
| 2005/0097364 A1* | 5/2005 | Edeki | .................... | G06F 21/552 726/4 |
| 2008/0082466 A1* | 4/2008 | Meijer | ................... | G06N 7/005 706/12 |
| 2008/0177726 A1* | 7/2008 | Forbes | ................. | G06F 16/907 |
| 2009/0210368 A1* | 8/2009 | Deo | ..................... | G06K 9/6267 706/20 |
| 2010/0064379 A1* | 3/2010 | Cassett | ............ | H04W 12/0802 726/34 |

(Continued)

*Primary Examiner* — Aravind K Moorthy
(74) *Attorney, Agent, or Firm* — Michael A. Springs (57) ABSTRACT

A system that includes an artificial intelligence (AI) system and an information service system. The information service system includes an authentication engine configured to authenticate the AI system to enable data transfers between the AI system and the information service system. The information service system further includes an AI service engine configured to receive behavior information for the user from the AI system and link the user with a classification type based on the content of the behavior information. The AI service engine is further configured to receive an information request from a user device associated with the user, to send the account information to the user device, to identify general information with a classification type that matches the classification type of the user and a classification type of the private information request, and to send the general information to the user device.

20 Claims, 5 Drawing Sheets

(56) References Cited

U.S. PATENT DOCUMENTS

| | | | | |
|---|---|---|---|---|
| 2010/0281539 A1* | | 11/2010 | Burns | H04L 63/1441 726/23 |
| 2012/0210420 A1* | | 8/2012 | Rybalko | H04L 51/12 726/22 |
| 2012/0222097 A1* | | 8/2012 | Wilson | G06Q 30/02 726/5 |
| 2013/0163808 A1* | | 6/2013 | Clements | H04L 9/3226 382/100 |
| 2013/0236878 A1* | | 9/2013 | Saltanov | G09B 7/02 434/353 |
| 2014/0143404 A1* | | 5/2014 | Kennedy | H04L 67/18 709/224 |
| 2014/0149327 A1* | | 5/2014 | Pino | G06N 3/02 706/25 |
| 2014/0180738 A1* | | 6/2014 | Phillipps | G06N 20/10 705/7.12 |
| 2015/0154502 A1* | | 6/2015 | Qiu | G06N 5/048 706/47 |
| 2015/0178496 A1* | | 6/2015 | Kohlenberg | H04L 63/1433 726/23 |
| 2016/0011732 A1* | | 1/2016 | Yang | G06F 21/50 715/763 |
| 2016/0019298 A1* | | 1/2016 | Brodie | G06F 16/148 707/734 |
| 2016/0063372 A1* | | 3/2016 | Choudhury | G06N 3/0436 706/20 |
| 2016/0092160 A1* | | 3/2016 | Graff | G10L 13/00 704/257 |
| 2016/0110528 A1* | | 4/2016 | Gupta | H04L 63/105 726/19 |
| 2016/0180239 A1* | | 6/2016 | Frankel | G06K 9/00771 706/12 |
| 2016/0330138 A1* | | 11/2016 | Thomason | G06F 9/45558 |
| 2017/0091879 A1* | | 3/2017 | Kanner | G06Q 10/10 |
| 2017/0206449 A1* | | 7/2017 | Lain | G06N 3/02 |
| 2017/0243136 A1* | | 8/2017 | Ho Kang | G06N 20/00 |
| 2017/0243223 A1* | | 8/2017 | Kolotinsky | G06F 21/316 |
| 2017/0300754 A1* | | 10/2017 | Ohm | G06K 9/6227 |
| 2017/0357828 A1* | | 12/2017 | Phillips | G06F 16/00 |
| 2018/0012133 A1* | | 1/2018 | Steiner | G06N 5/047 |
| 2018/0024639 A1* | | 1/2018 | Creamer | G06F 3/011 382/103 |
| 2018/0025287 A1* | | 1/2018 | Mathew | G06N 20/00 706/12 |
| 2018/0097910 A1* | | 4/2018 | D'Agostino | H04L 67/10 |
| 2018/0108272 A1* | | 4/2018 | Ahmad | G09B 5/02 |
| 2018/0173999 A1* | | 6/2018 | Renard | G06F 40/284 |
| 2018/0189282 A1* | | 7/2018 | Hartlaub | G06F 16/9535 |
| 2018/0240152 A1* | | 8/2018 | Mookherjee | G06Q 30/0256 |
| 2018/0247241 A1* | | 8/2018 | Avrahami | G06Q 10/0639 |
| 2018/0310123 A1* | | 10/2018 | Deluca | H04L 67/22 |
| 2018/0314972 A1* | | 11/2018 | Swindell | G06F 9/451 |
| 2018/0316571 A1* | | 11/2018 | Andrade | G06Q 10/06398 |
| 2019/0012387 A1* | | 1/2019 | Li | G06O 30/0269 |
| 2019/0052659 A1* | | 2/2019 | Weingarten | H04L 67/34 |
| 2019/0068604 A1* | | 2/2019 | Legault | H04L 63/102 |
| 2019/0073457 A1* | | 3/2019 | Jiang | G06F 3/0412 |
| 2019/0081878 A1* | | 3/2019 | Lawrence | H04L 63/123 |
| 2019/0081965 A1* | | 3/2019 | Oz | G06N 20/00 |
| 2019/0087691 A1* | | 3/2019 | Jelveh | G06K 9/6254 |
| 2019/0087791 A1* | | 3/2019 | Delaney | G06Q 20/02 |
| 2019/0102684 A1* | | 4/2019 | Beran | G06N 3/08 |
| 2019/0109878 A1* | | 4/2019 | Boyadjiev | H04L 63/102 |
| 2019/0138600 A1* | | 5/2019 | Krishnan | G06F 40/35 |
| 2019/0147356 A1* | | 5/2019 | Peng | G06N 3/0445 706/21 |
| 2019/0147366 A1* | | 5/2019 | Sankaran | G06N 20/00 706/12 |
| 2019/0166141 A1* | | 5/2019 | Xu | H04L 63/1416 |
| 2019/0213488 A1* | | 7/2019 | Zou | G06F 16/90335 |
| 2019/0220583 A1* | | 7/2019 | Douglas | G06F 21/316 |
| 2019/0236249 A1* | | 8/2019 | Pavlou | G06F 16/24578 |
| 2019/0236466 A1* | | 8/2019 | Harrison | G06N 5/043 |
| 2019/0266287 A1* | | 8/2019 | Chen | G06F 16/3329 |
| 2019/0295114 A1* | | 9/2019 | Pavletic | G06N 3/08 |
| 2019/0317510 A1* | | 10/2019 | Ros Sanchez | G05D 1/0221 |
| 2019/0318044 A1* | | 10/2019 | Leka | G06K 9/46 |
| 2019/0325523 A1* | | 10/2019 | Demetry | G06F 16/2379 |
| 2019/0332752 A1* | | 10/2019 | Gordon | G06F 21/552 |
| 2019/0335006 A1* | | 10/2019 | George | G06N 3/084 |
| 2019/0342286 A1* | | 11/2019 | Cobb | G06K 9/6267 |
| 2019/0354805 A1* | | 11/2019 | Hind | G06N 20/00 |
| 2019/0370218 A1* | | 12/2019 | Di Pietro | G06K 9/6263 |
| 2019/0370391 A1* | | 12/2019 | Ezen Can | G06N 5/02 |
| 2019/0370697 A1* | | 12/2019 | Ramachandra Iyer | G06K 9/6278 |
| 2019/0377853 A1* | | 12/2019 | Obaidi | G06F 21/316 |
| 2019/0385212 A1* | | 12/2019 | DeLuca | G06Q 30/0631 |
| 2019/0392128 A1* | | 12/2019 | Conde | G06K 9/6274 |
| 2020/0005116 A1* | | 1/2020 | Kuo | G06N 20/00 |
| 2020/0005195 A1* | | 1/2020 | Fang | G06F 21/552 |
| 2020/0019418 A1* | | 1/2020 | P K | G06K 9/6267 |
| 2020/0026263 A1* | | 1/2020 | Haberkern | G05B 19/41865 |
| 2020/0042621 A1* | | 2/2020 | Frank | G06F 40/169 |
| 2020/0043066 A1* | | 2/2020 | Obaidi | G06N 20/00 |
| 2020/0067923 A1* | | 2/2020 | Dasari | G06F 21/45 |
| 2020/0089552 A1* | | 3/2020 | Pattan | H04L 41/0893 |
| 2020/0100104 A1* | | 3/2020 | Paeschke | G06F 21/316 |
| 2020/0126664 A1* | | 4/2020 | Sato | G16H 50/20 |
| 2020/0372472 A1* | | 11/2020 | Kenthapadi | G06Q 10/1053 |

* cited by examiner

FEDERATED AUTHENTICATION FOR INFORMATION SHARING ARTIFICIAL INTELLIGENCE SYSTEMS

TECHNICAL FIELD

The present disclosure relates generally to an authentication process, and more specifically to a federated authentication process between artificial intelligence (AI) systems.

BACKGROUND

One of the technical challenges associated with exchanging data between different computer systems is that each computer system may have its own security and data access requirements. For example, some computer systems may store sensitive or confidential information which requires a high level of security and data access control. Other computer systems may not store sensitive information and may use a lower level of security and data access control. Allowing data communications between computer systems with different levels of information security poses a security risk to the computer system that requires a high level of security and data access control. For example, a bad actor may compromise a computer system that has a lower level of security to access and exfiltrate data from a computer system with a higher level of security. This poses a technical challenge for computer systems because they are limited on which other systems and devices they can exchange data with. Exchanging data with some computer systems may weaken the computer system's ability to provide information security and may leave the computer system vulnerable to attacks from compromised computer systems.

SUMMARY

One of the technical challenges associated with exchanging data between different computer systems is that each computer system may have its own security and data access requirements. For example, some computer systems may store sensitive or confidential information which requires a high level of security and data access control. Other computer systems may not store sensitive information and may use a lower level of security and data access control. Allowing data communications between computer systems with different levels of information security poses a security risk to the computer system that requires a high level of security and data access control. For example, a bad actor may compromise a computer system that has a lower level of security to access and exfiltrate data from a computer system with a higher level of security. This poses a technical challenge for computer systems because they are limited on which other systems and devices they can exchange data with. Exchanging data with some computer systems may weaken the computer system's ability to provide information security and may leave the computer system vulnerable to attacks from compromised computer systems.

One example of an attack includes exposure to malware from a compromised computer system. For example, a bad actor may comprise one computer system to send malware to another computer system. Once malware is downloaded by the computer system, the malware can overload computing resources by running authorized programs and scripts on the system. In addition, malware can cause disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system. Thus, it is desirable to protect computer systems and their resources from attacks when communicating with other computer systems.

The system described in the present application provides a technical solution to the technical problems discussed above by enabling computer systems to securely exchange data with each other without compromising their information security or exposing themselves to attacks. The disclosed system provides several technical advantages which include 1) a federated authentication process that allows computer systems (e.g. artificial intelligence (AI) systems) to authenticate themselves before exchange information with other computer systems (e.g. other AI systems) and 2) the ability to exchange information between computer systems that may have different levels of information security requirements.

In one embodiment, the authentication process can be performed by an AI system before communicating (i.e. sending or receiving) information with another AI system that may have a lower level of information security and data access control. The authentication process may use information provided by an AI device and/or a user to authenticate the AI system. This authentication process provides information security by ensuring that any received information comes from trusted AI systems and AI devices. In other words, the disclosed authentication process enables an AI system to securely exchange data with a larger number of systems and devices without weakening its ability to provide information security and without leaving the AI system vulnerable to attacks from compromised systems. This process protects the AI systems from attacks, such as malware, and improves the operation of the system by preventing attacks that can gain unauthorize access to system resources, reduce the performance of the system, or exfiltrate data.

In one embodiment, information security can be further increased by limiting data transfers to be unidirectional. For example, once authenticated, data exchanges between AI systems may be restricted such that data can only be sent from the AI system having a lower level of security to the AI system having a higher level of security. In this configuration, the AI system with a higher level of security is protected from data exfiltration in the event the AI system with the lower level of security becomes compromised. Thus, the disclosed authentication process improves the operation of an AI system by allowing the AI system to securely communicate with other AI systems regardless of their level of information security requirements.

Once the authentication process is complete, data can be exchanged between authenticated AI systems over a network. The ability to securely exchange information between AI systems that have different levels of information security requirements increases the functionality of the AI systems, which improves the operation of the AI systems. For example, this technical feature improves the operation of an AI system by allowing the AI system to leverage information acquired by other AI systems when interacting with a user. This allows the AI system to use resource sharing to offload some functionalities for interacting with users to other AI systems and to more efficiently manage its own resources. In other words, by leveraging information from other AI systems, an AI system can increase its access to information without having to dedicate additional resources or increasing hardware complexity.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed herein provides several technical advantages which include 1) a federated authentication process that allows computer systems (e.g. artificial intelligence (AI) systems) to authenticate themselves before exchange information with other computer systems (e.g. other AI systems) and 2) the ability to exchange information between computer systems that may have different levels of information security requirements.

Figure 1:
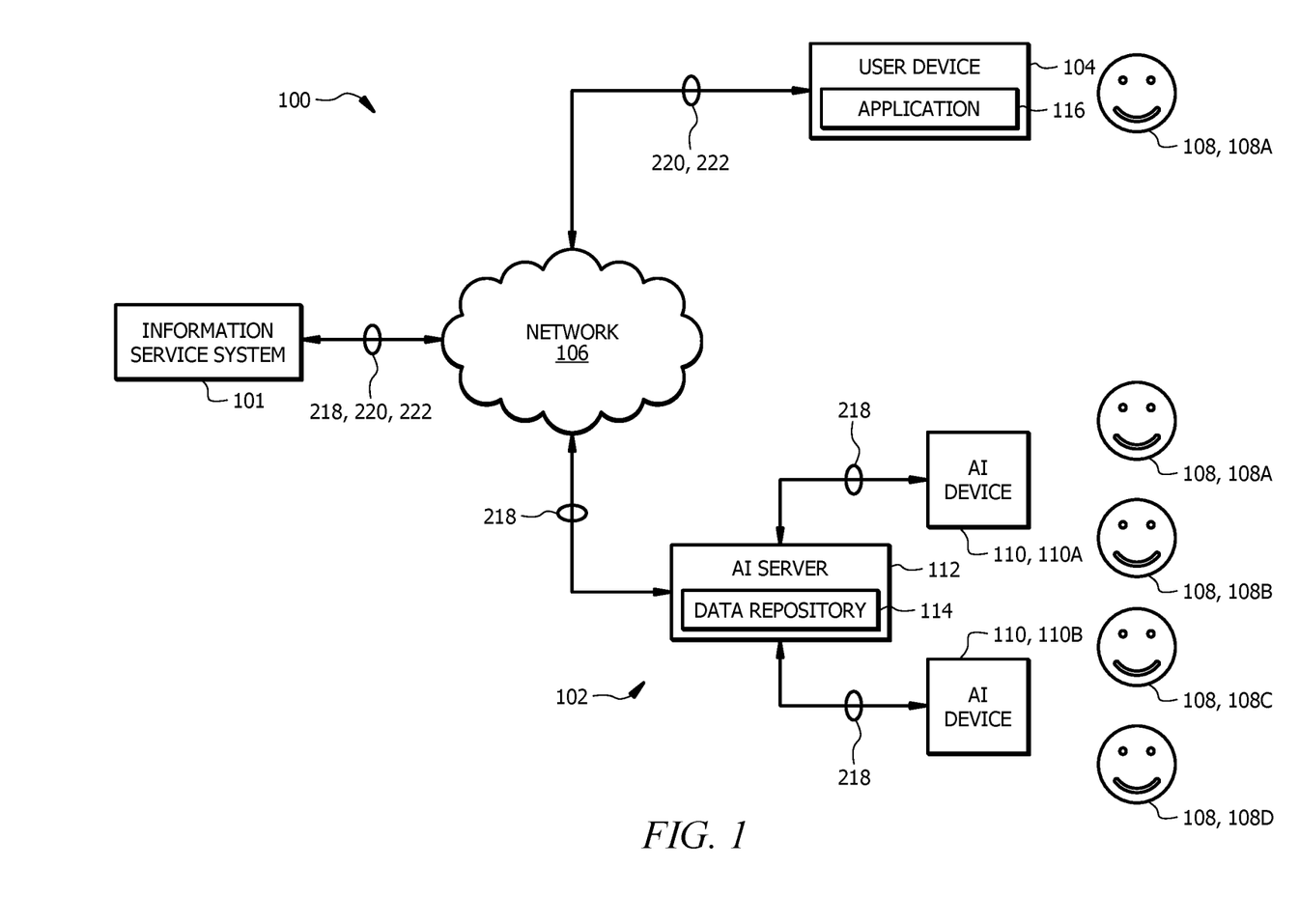
FIG. 1 is a schematic diagram of an embodiment of a communication system for artificial intelligence (AI) systems.
Figure 2:
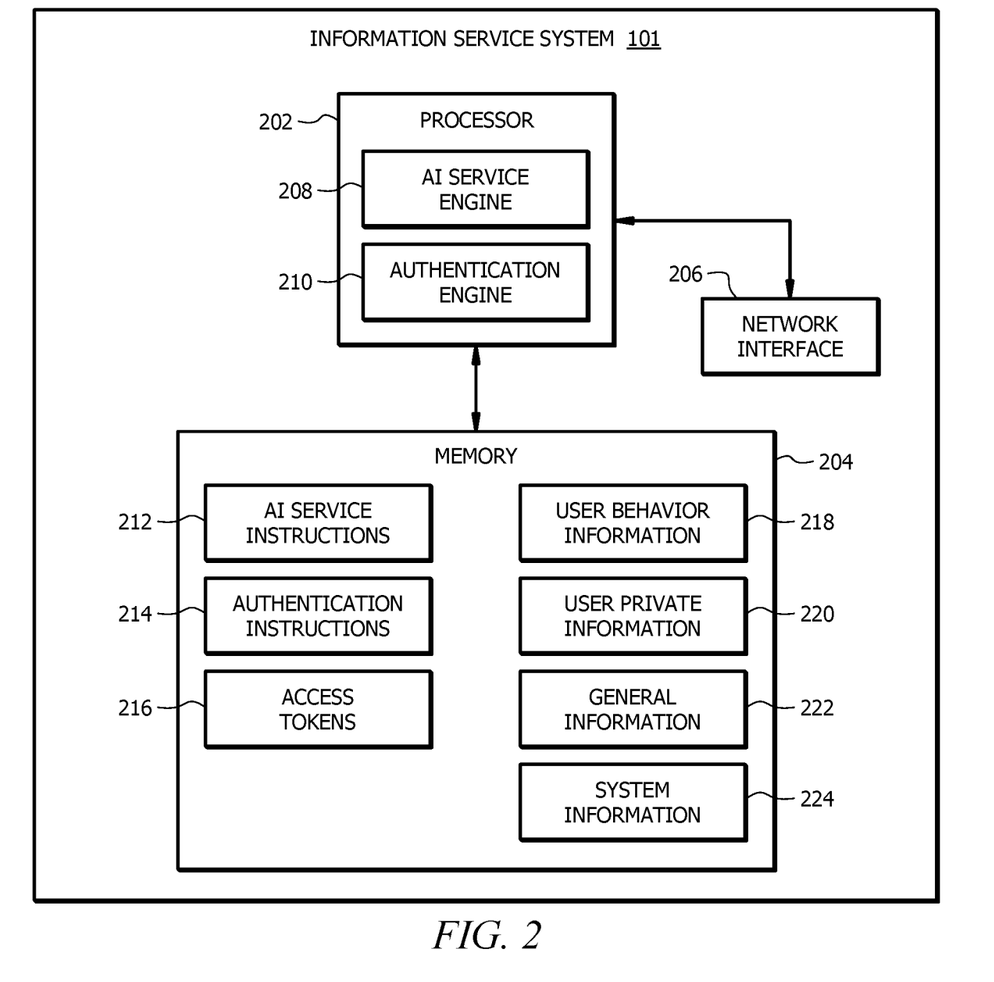
FIG. 2 is a schematic diagram of an embodiment of an information service system.
Figure 3:
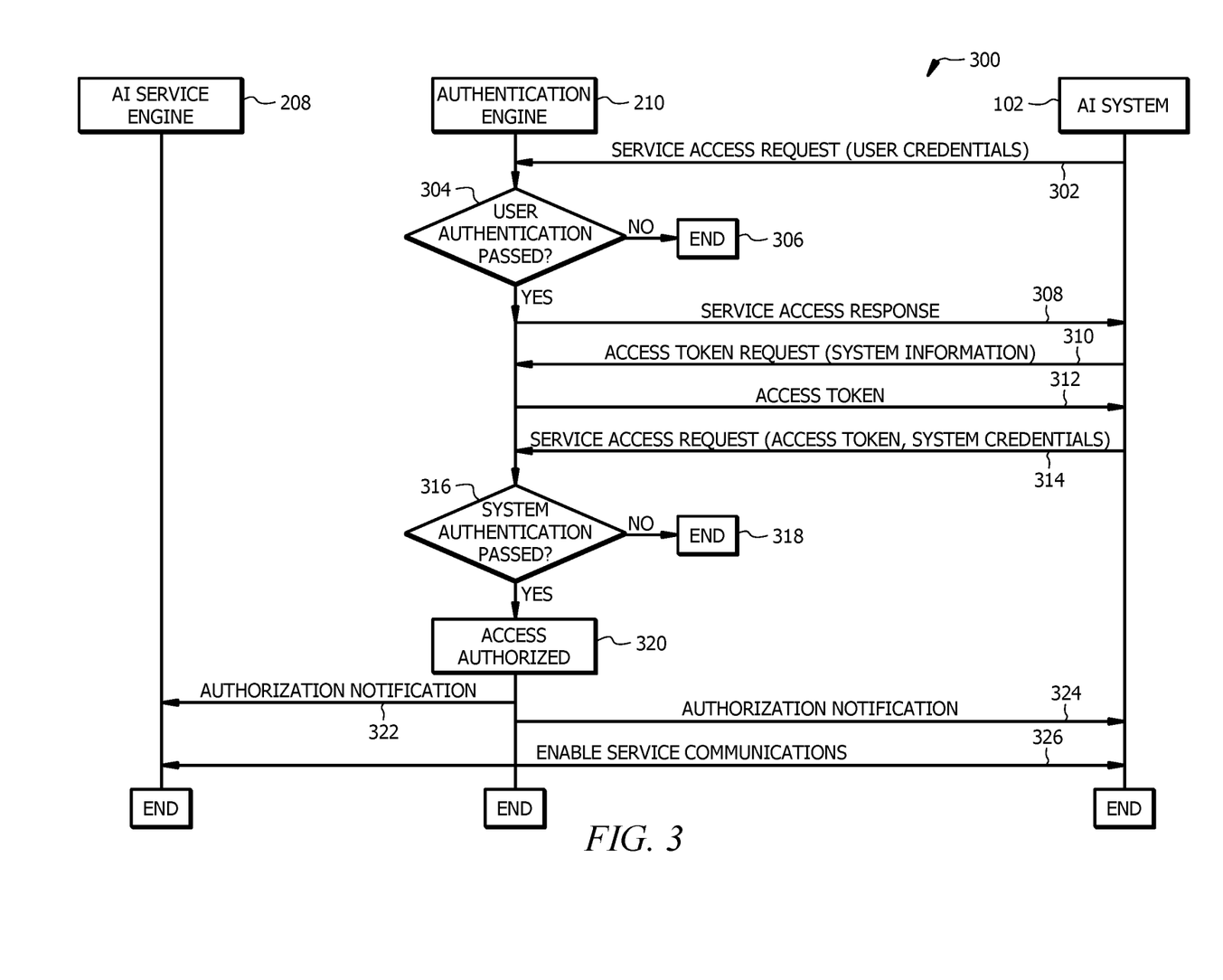
FIG. 3 is a protocol diagram of an embodiment of a federated authentication method between AI systems.
Figure 4:
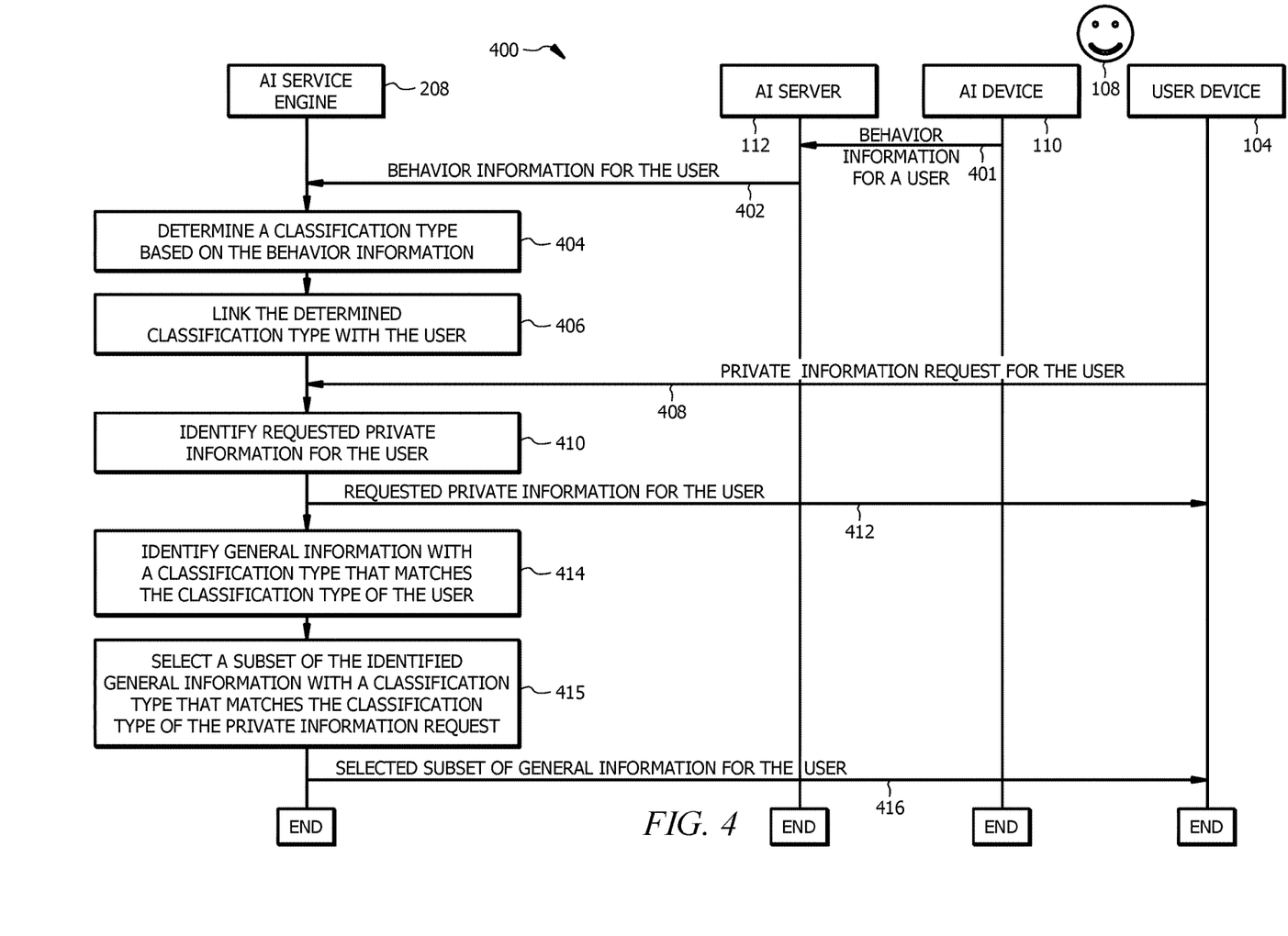
FIG. 4 is a protocol diagram of an embodiment of an information sharing method between AI systems.
Figure 5:
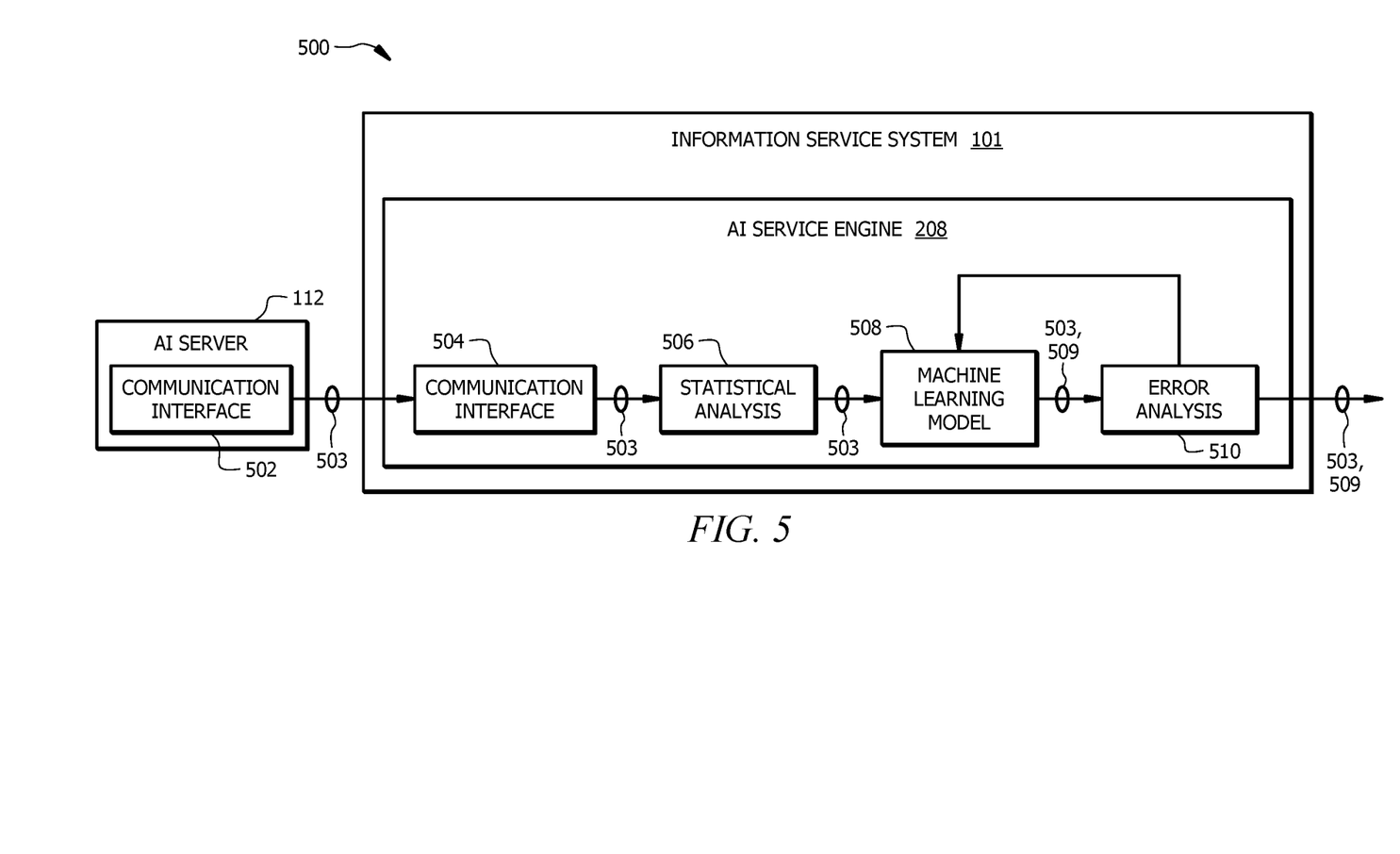
FIG. 5 is a schematic diagram of an embodiment of an information processing flow between an AI system and an AI service engine.

FIG. 1 is an embodiment of a communication system which allows different AI systems to exchange data with each other. FIG. 2 is an embodiment of an AI system configured to perform a federated authentication process with other AI system and to exchange information with the other AI systems. FIG. 3 is an embodiment of a federated authentication process for authenticating an AI system before exchanging information with the AI system. FIG. 4 is an embodiment of a process for providing information to a user. FIG. 5 is an embodiment of a process flow for processing information from an AI system.

FIG. 1 is a schematic diagram of an embodiment of a communication system 100 for AI systems. The communication system 100 comprises a first AI system (shown as information service system 101) in signal communication with one or more other AI systems 102 and one or more user devices 104 via a network 106. The communication system 100 may be configured as shown in FIG. 1 or in any other suitable configuration. For example, the information service system 101 may be in signal communication with any suitable number of AI systems 102 and/or user devices 104.

Configuration for Information Sharing Between AI Systems

The communication system 100 is configured such that the information service system 101 exchanges information with other AI systems 102 to learn information about a user 108 based on the user's interactions or behavior with other AI systems 102. The information service system 101 is configured to process and use learned information when the information service system 101 interacts with the user 108. For example, a user 108A may interact with an AI device 110A (e.g. a conversational AI hub) to request information (e.g. information about sports, movies, or music) or to make purchases. The AI system 102 is configured to send information (e.g. behavior information 218) about the user 108A to the information service system 101. The information service system 101 is configured to process the received information to learn about the user 108A. For example, the information service system 101 may process the received information to identify the user's 108A interest in hobbies, sports, movies, music, art, entertainment, or any other type of interest.

At a later time, the user 108A may communicate with the information service system 101 using a user device 104 (e.g. a smart phone) to request private information 220 (e.g. account information). The user device 104 is a different device than the AI device 110 that was used to collect behavior information 218 for the user 108A. The information service system 101 is configured to process the request and to send the requested private information 220 to the user 108A. The information service system 101 is further configured to identify a classification type of the private information request and to send additional general information 222 (e.g. information related to the user's 108A interests) which is selected based on the previously received behavior information 218 for the user 108A from the other AI systems 102 and the classification type of the private information request. An example of this process is described in FIG. 4. This technical feature improves the operation of the information service system 101 by allowing the information service system 101 to leverage information acquired by other AI systems 102 when interacting with user 108. This allows the information service system 101 to use resource sharing to offload some functionalities for interacting with users 108 to other AI systems 102 which allows the information service system 101 to more efficiently manage its own resources.

In addition, this process improves the user's 108A experience when interacting with the information service system 101. For example, the information service system 101 is able to provide the user 108A with their requested private information 220 as well as with additional information (i.e. general information 222) that is selected based on the combination of the user's 108A previous interactions with other devices (e.g. AI devices 110) and the type of information (i.e. private information) the user 108A is currently interested in. This process improves the information service system's 101 ability to enhance the user's 108A experience by providing the user 108 with additional information that is relevant to the user 108A. This process provides a better user experience and a technical improvement over systems that rely on only using past information about a user 108A which may no longer be relevant or useful to the user 108A.

Configuration for a Federated Authentication Process Between AI Systems

The information service system 101 is configured to store sensitive information (i.e. private information 220) and may have higher security requirements or more restrictive access control that other AI systems 102. The information service system 101 is configured to perform a federated authentication process with other AI systems 102 before exchanging information with the other AI systems 102. An example of the federated authentication process is described in FIG. 3. This authentication process provides information security by ensuring that received information for user 108 comes from trusted AI systems 102, AI servers 112, and AI devices 110. In addition, this authentication process protects the information service system 101 from attacks and improves the operation of the system by preventing attacks that can gain unauthorized access to system resources, reduce the performance of the system, or exfiltrate data. Once the authentication process is complete, data can be exchanged between the information service system 101 and authenticated AI systems 102 over the network 106.

An AI system 102 comprises an AI server 112 in signal communication with one or more AI devices 110. Examples of AI devices 110 include, but are not limited to, an Internet-of-Things (IoT) device, a computer (e.g. a desktop computer, a laptop computer, and a tablet computer), a mobile phone, a conversational AI hub, a home automation device, or a smart device (e.g. smart television or smart appliance). The AI server 112 may be any suitable type of device for communicating data between AI devices 110 and the information service system 101. For example, the AI server 112 may be a server or cloud server. The AI server 112 may comprise a memory or data repository 114 configured to store data (e.g. behavior information 218) from the AI devices 110. In one embodiment, an AI server 112 and an AI device 110 may be integrated into a single device.

An AI system 102 may be configured to serve multiple groups of users 108. For example, a first AI device 110A may be associated with a first location (e.g. a home, school, or business) and may serve a first set of users 108 (e.g. users 108A and 108B). A second AI device 110B may be associated with a second location and a second set of users 108 (e.g. users 108C and 108D). Although FIG. 1 illustrates a communication system 100 with a single AI system 102, one of ordinary skill in the arts would appreciate that in other embodiments the communication system 100 may comprise the information service system 101 in signal communication with any suitable number of AI systems 102 and AI devices 110.

Examples of user devices 104 include, but are not limited to, Internet-of-things (IoT) devices, desktop computers, mobile phones, tablet computers, and laptop computers. A user device 104 is configured to send information requests to the information service system 101 and to receive information from the information service system 101. In one embodiment, the user device 104 is configured to initiate information requests with the information service system 101 using voice commands from a user 108 over a telephone or cellular network connection. In another embodiment, the user device 104 is configured to initiate information requests with the information service system 101 using an application 116. Examples of applications 116 include, but are not limited to, phone applications, computer applications, and web browsers. For example, the user device 104 may send information request and receive information from the information service system 101 using inputs (e.g. gestures and/or voice commands) provided by a user 108 interacting the application 116.

The network 106 is any suitable type of wireless and/or wired network including, but not limited to, all or a portion of the Internet, an Intranet, a peer-to-peer network, the public switched telephone network, a cellular network, and a satellite network. The network 106 is configured to support any suitable communication protocols as would be appreciated by one of ordinary skill in the art upon viewing this disclosure. The network 106 may comprise one or more network devices. Examples of network devices include, but are not limited to, web clients, web servers, routers, modems, bridges, or any other suitable type of network device.

FIG. 2 is a schematic diagram of an embodiment of the information service system 101. The information service system 101 comprises a processor 202, a memory 204, and a network interface 206. The information service system 101 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an AI service engine 208 and an authentication engine 210. In this way, processor 202 may be a special purpose computer designed to implement function disclosed herein. In an embodiment, the AI service engine 208 and the authentication engine 210 are each implemented using logic units, FPGAs, ASICs, DSPs, or any other suitable hardware.

The AI service engine 208 is configured to receive and process behavior information 218 for a user 108. The AI service engine 208 is further configured to provide information (e.g. private information 220 and general information 222) to the user 108 in response to information requests from the user 108. Examples of the AI service engine 208 in operation are described in FIGS. 3, 4, and 5.

The Authentication engine 210 is configured to authenticate other AI systems 102 before exchanging information about a user 108 between the information service system 101 and other AI system 102. Examples of the authentication engine 210 in operation are described in FIGS. 3 and 4.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store AI service instructions 212, authentication instructions 214, access tokens 216, user behavior information 218, user private information 220, general information 222, system information 224, and/or any other data or instructions. The AI service instructions 212 and the authentication instructions 214 may comprise any suitable set of instructions, logic, rules, or code operable to execute the AI service engine 208 and the authentication engine 210, respectively.

Access tokens 216 are generated and used by the information service system 101 when authenticating AI systems 102. For example, the information service system 101 sends an access token 216 to an AI system 102 when performing a federated authentication process similar to the authentication process described in FIG. 3. Access tokens 216 may be unique alphanumeric strings or any other suitable type of token as would be appreciated by one of ordinary skill in the art. In one embodiment, access tokens 216 are one-time use tokens. In another embodiment, access tokens 216 may be uniquely assigned to an AI system 102 which allows the AI system 102 to use the access token 216 any time the AI system 102 authenticates itself with the information service system 101. In some embodiments, the information service system 101 generates access tokens 216 on demand.

User behavior information 218 comprises information about a user 108 based on their interactions with an AI device 110. Examples of user behavior information 218 include, but are not limited to, information about recent purchases, search queries, Internet browsing information, information requests, multimedia requests (e.g. movie or music requests), home automation actions performed by a user 108, or any other suitable type of information. User behavior information 218 may be classified and associated with one or more classification types. In one example, classification types are tags or identifiers that indicate types of information a user 108 may be interested in based on their interactions with AI devices 110. For instance, a user 108 may purchase music concert tickets using an AI device 110. The AI device 110 may generate user behavior information 218 that comprise information about the user's 108 transaction such as transaction information, event information, music information, or any other type of information. In this example, the information service system 101 may extract information from the behavior information 218 to identify classification types for the user 108. For instance, the user 108 may be associated with classification types such as band names, city names, venue names, "rock music," "concerts," or any other suitable classification types based on the behavior information 218. In other examples, the information service system 101 may use any other information from the behavior information 218 to determine a user's 108 interest and classification types for the user 108.

As another example, classification types may identify demographic information about a user 108. For instance, classification types may indicate demographic information about a user 108 such as age, gender, ethnicity, race, religious preference, income, residential information, or any other suitable demographic information about the user 108. The information service engine 101 may process behavior information 218 for a user 108 to determine demographic information for the user 108. For example, the information service system 101 may determine where a user 108 lives based on the locations of their transactions or an income level for the user 108 based on the purchasing habits. In other examples, the information service system 101 may use any other information from the behavior information 218 to determine demographic information and classification types for the user 108. An example of a classification process is described in FIG. 5.

User private information 220 comprises uniquely associated with a user 108. In one embodiment, user private information 220 comprises information for the user 108 that is access limited. In other words, user private information 220 may be protected information that requires a user 108 to be authenticated before allowing access the information. For example, a user 108 may be prompted to provide authentication information (e.g. username and password or biometric signal) by the information service system 101 and/or by the user device 104 before requesting user private information 220. Examples of private information 220 include, but are not limited to, personal information, account information, financial information, health information, user credentials, or any other type of restricted access information. Examples of user credentials include, but are not limited to, a username and password, a token, a passcode, a biometric signal (e.g. a fingerprint scan, a face image, or a voice sample), or any other suitable type of user credential.

General information 222 comprises information that may not be uniquely associated with a user 108. In other words, general information 222 comprises information that is not access limited. For example, general information 222 may comprise information about various topics that is sourced from the Internet or any other public sources. Examples of general information 222 include, but are not limited to, information about events, music, art, technology, products, traveling, food, sports, or any other type of information. For example, general information may comprise information about local events. General information 222 may be linked with one or more classification types based on the subject matter or content of the information. For example, general information 222 about an upcoming concert may be associated with classification types of "music," "entertainment," or "events." In one embodiment, general information 222 for a user 108 may comprise information relevant for a group associated with the user 108. For example, general information 222 may be limited to information topics or sources that a group is interested in. Examples of groups include, but are not limited to, a family, a business group, and a friends group. For example, general information 222 for a user 108 may comprise information on topics that are of interest for the user's 108 entire family.

System information 224 comprises information associated with AI systems 102. For example, system information 224 may comprise information for AI servers 112 and AI devices 110. Examples of system information 224 include, but are not limited to, an identifier (e.g. a media access control (MAC) address or an Internet Protocol (IP) address), system credentials (e.g. a passcode or a token), or any other information associated with an AI system 102. System information 224 may be used by the information service system 101 when authenticating AI systems 102.

The network interface 206 is configured to enable wired and/or wireless communications. The network interface 206 is configured to communicate data between the information service system 101 and AI systems 102, user devices 104, and/or any other system or domain. For example, the network interface 206 may comprise a WIFI interface, a local area network (LAN) interface, a wide area network (WAN) interface, a modem, a switch, or a router. The processor 202 is configured to send and receive data using the network interface 206. The network interface 206 may be configured to use any suitable type of communication protocol as would be appreciated by one of ordinary skill in the art.

Federated Authentication Process Between AI Systems

FIG. 3 is a protocol diagram of an embodiment of a federated authentication method 300 between AI systems. For example, method 300 may be implemented by the information service system 101 to authenticate an AI system 102 before exchanging information about a user 108 with the AI system 102. In this example, an AI server 112 may communicate with the information service system 101 to authenticate the AI system 102. In one embodiment, method 300 may be implemented using a security assertion markup language (SAML) framework. In other embodiments, method 300 may be implemented using any other suitable type of framework as would be appreciated by one of ordinary skill in the art.

At step 302, an AI system 102 (e.g. AI server 112) sends a service access request to the authentication engine 210. The service access request comprises user credentials for a user 108. Examples of user credentials include, but are not limited to, a username and password, a token, a passcode, a biometric signal (e.g. a fingerprint scan, a face image, or a voice sample), or any other suitable type of user credentials. In one embodiment, the AI server 112 obtains the user credentials from the user via an AI device 110. For example, the user 108 may interact with the AI device 110 to provide their user credentials.

At step 304, the authentication engine 210 determines whether user authentication has been passed based on the user credentials provided in the service access request. For example, the authentication engine 210 compares the received user credentials to previously stored user credentials to determine whether the user 108 passes user authentication. The authentication engine 210 determines that the user 108 passes user authentication when the received user credentials matches the previously stored user credential information. The authentication engine 210 proceeds to step 308 in response to determining that user authentication has been passed. At step 308, the authentication engine 210 sends a service access response to the AI system 102 indicates that user authentication has been passed. Otherwise, the authentication engine 210 proceeds to step 306 and method 300 terminates.

At step 310, the AI system 102 sends an access token request to the authentication engine 210 upon receiving the service access response. The access token request comprises system information 224 for the AI system 102. For example, the system information 224 may comprise an identifier (e.g. a MAC address or an IP address) or any other type of system information.

At step 312, the authentication engine 210 sends an access token 216 to the AI system 102. In one embodiment, the access token 216 is a one-time use token. In another embodiment, the access token 216 is uniquely assigned to the AI system 102. For example, the authentication engine 210 may identify an access token 216 for the AI system 102 based on the received system information 224. In some embodiments, the authentication engine 210 generates the access tokens 216 on demand. For example, the authentication engine 210 may generate a random access token 216 for the AI system 102. As another example, the authentication engine 210 may generate the access token 216 based on the received system information 224 for the AI system 102.

At step 314, the AI system 102 sends a system access request to the authentication engine 210. The system access request comprises the access token 216 and system credentials for the AI system 102. Examples of system credentials for the AI system 102 include, but are not limited to, an identifier (e.g. a MAC address or an IP address), a passcode, a second token, or any other suitable type of system credential.

At step 316, the authentication engine 210 determines whether system authentication has been passed based on the information provided in the system access request. For example, the authentication engine 210 compares the received system credentials to previously stored system credentials to determine whether the AI system 102 passes system authentication. The authentication engine 210 determines that the AI system 102 passes user authentication when the received system credentials matches the previously stored system credential information. The authentication engine 120 proceeds to step 320 in response to determining that system authentication has been passed. Otherwise, the authentication engine 210 proceeds to step 318 and method 300 terminates.

At step 320, the authentication engine 210 determines that access is authorized between the AI system 102 and the AI service engine 208 in the information service system 101 when both user authentication and system authentication have been passed. Passing both authentications means that the authentication engine 210 has successfully authenticated the AI system 102 and the user 108 and the AI service engine 208 is authorized to begin exchanging data with the AI system 102.

At step 322, the authentication engine 210 sends an authorization notification to the AI service engine 208. At step 324, the authentication engine 210 sends an authorization notification to the AI system 102. The authorization notification indicates that both the AI system 102 and the user 108 have been authenticated and the AI service engine 208 may begin exchanging data with the AI system 102.

At step 326, service communications between the AI system 102 and the AI service system 208 are enabled which allows data to be communicated between the information service system 101 and the AI system 102. For example, the AI system 102 may begin sending data (e.g. behavior information 218 for the user 108) to the AI service engine 208. In one embodiment, the AI system 102 may periodically send data to the AI service engine 208. The AI service engine 208 may send data to the AI service engine 208 at any suitable interval of time. In another embodiment, the AI service engine 208 may send a data request to the AI system 102 and the AI system 102 may send the requested data in response to receiving the data request.

In one embodiment, data transfers between the information service system 101 and the AI system 102 are unidirectional. For example, data about a user 108 may only be communicated from the AI system 102 to the information service system 101. In this configuration, the information service system 101 provides increased data access control to prevent data from being exfiltrated to the AI system 102 which may be a less secure system.

Information Sharing Process Between AI Systems

FIG. 4 is a protocol diagram of an embodiment of an information sharing method 400 between AI systems. For example, method 400 may be implemented by the information service system 101 to receive and process behavior information 218 about a user 108. The information service system 101 may also implement method 400 to provide information (e.g. private information 220 and general information 222) to the user 108 in response to an information request from the user 108.

At step 401, an AI device 110 sends behavior information 218 for a user 108 based on the user's 108 interactions with the AI device 110. The behavior information 218 may comprise information about gestures performed by the user 108, voice commands provided by the user 108, recent purchases, search queries, Internet browsing history, information requests, multimedia requests (e.g. movie or music requests), home automation actions performed by a user 108, or any other suitable type of information. For example, a user 108 may interact with the AI device 110 to request information about a movie and to purchase movie tickets. In this example, the AI device 110 collects and sends behavior information 218 about the user's 108 information request and purchase. The AI server 112 is configured to receive and store the behavior information 218 for the user 108 from the AI device 110. The AI server 112 may periodically receive and collect behavior information 218 for the user 108 over any suitable time period.

At step 402, the AI system 102 (e.g. AI server 112) sends behavior information 218 to the AI service engine 208. In one embodiment, the AI system 102 may periodically send behavior information 218 to the AI service engine 208. The AI service engine 208 may send data to the AI service engine 208 at any suitable interval of time. In another embodiment, the AI service engine 208 may send a data request to the AI system 102 and the AI system 102 may send behavior information 218 in response to receiving the data request.

At step 404, the AI service engine 208 determines a first classification type based on the behavior information 218. In one embodiment, the AI service engine 208 may use a process similar to the process described in FIG. 5 to determine a first classification type for the user 108 based on received behavior information 218. For example, the AI service engine 208 may apply a machine learning model or a neural network model to the behavior information 218 to determine a first classification type for the user 108. In another embodiment, the AI service system 208 may use natural language processing on the behavior information 218 to determine a first classification type for the user 108. In other embodiments, the AI service system 208 may use any other suitable technique for determining a first classification type for the user 108 as would be appreciated by one of ordinary skill in the art. The first classification type may indicate demographic information for the user 108, topics the user 108 is interested, or any other information about the user 108 based on their behavior information 218.

At step 406, the AI service engine 208 links the determined first classification type with the user 108. In one embodiment, the AI service engine 208 links the determined first classification type with the user 108 by adding or modifying metadata associated with the user 108. For example, the AI service engine 208 may associate a metadata tag with the user's 108 stored information (e.g. private information 220). In other embodiments, the AI service engine 208 may link the first classification type with the user 108 using any other suitable technique as would be appreciated by one of ordinary skill in the art.

At a later time, the same user 108 may use a user device 104 to request information from the information service system 101. The user device 104 is a different device from the AI device 110 that was used to collect behavior information 218 about the user 108. At step 408, a user device 104 sends a private information request for the user 108 to the AI service engine 208. For example, a user 108 may use their user device 104 to authenticate themselves and to request private information such as account information. The private information request may identify account information such as account balances, personal information, medical information, or any other type of information within the stored user private information 220. The user 108 may use their user device 104 to generate and send a private information request. In one embodiment, the user 108 may generate and send the private information request using an application 116. For example, the user 108 may use gestures, text, and/or voice commands with the application 116 to generate the private information request. As another example, the user 108 may generate and send the private information request by using voice commands during a phone call. In other embodiments, the user 108 may generate private information requests using any other suitable technique as would be appreciated by one of ordinary skill in the art.

At step 410, the AI service engine 208 identifies the requested information for the user 108. For example, the AI service engine 208 may identify that the user 108 is requesting account information and may extract the request information from within the stored user private information 220. In one embodiment, receiving the private information request indicates that the user 108 has been authenticated by their user device 104 and the AI service engine 208 is approved to send the requested information. In another embodiment, the AI service engine 208 may prompt the user 108 to pass authentication before sending the requested information. For example, the AI service engine 208 may request user credentials for the user 108 using a process similar step 304 in FIG. 3 before sending the requested information. In other examples, the AI service engine 208 may authenticate the user 108 using any other suitable technique as would be appreciated by one of ordinary skill in the art. At step 412, the AI service engine 208 sends the requested private information to the user device 104. The user 108 may access the private information 220 once the user device 104 receives the private information 220 from the AI service engine 208.

The AI service engine 208 determines a second classification type based on the subject matter or the type of information requested in the private information request. For instance, the AI service engine 208 may determine that the private information request requests information about a recent transaction for example a hotel reservation. The AI service engine 208 may select a second classification type that corresponds with the recent transaction. For example, the AI service engine 208 may select a second classification type that corresponds with "vacation," "traveling," or the location of the hotel. The AI service engine 208 may determine the second classification type using a machine learning model, a neural network model, natural language processing, or any other suitable technique.

At step 414, the AI service engine 208 identifies general information 222 with a classification type that matches the first classification type for the user 108. For example, the AI service engine 208 may identify the first classification type linked with user 108 and use the first classification type to identify general information 222 with a corresponding classification type. For example, the user 108 may be linked with a first classification type that indicates the user 108 is interested in local sports. The AI service system 208 may identify general information 222 that is classified as "sports" or "local sports." As another example, the user 108 may be linked with a first classification type that indicates the user 108 is interested in a particular genre of music. In this example, the AI service system 208 may identify general information 222 related to music events or music groups. The general information 222 may comprise information about events, music, art, technology, products, traveling, food, sports, or any other suitable type of information.

At step 415, the AI service engine 208 selects a subset of the identified general information 222 with a classification type that matches the second classification type. As an example, the AI service engine 208 may determine that the user 108 is linked with first classification type that indicates the user 108 is interested in particular music genre and may identify general information 222 with a classification type that is related to the type of music the user 108 is interested in. For instance, the AI service engine 208 may identify general information 222 that comprises event information about the type of music the user 108 is interested in. The AI service engine 208 may then use the second classification type, which is based on the private information request, to filter the identified general information 222 and to select a subset of the general information 222 for the user 108. For instance, the AI service 208 may determine a second classification type that is associated with information about a recent vacation purchase. In this example, the AI service engine 208 may filter through the general information 222, which comprises event information about the type of music the user 108 is interested in, to select information about music events that will occur at the location where the user 108 will be vacationing. In this example, the AI service engine 208 is able to provide the user 108 with additional information (i.e. general information 222) that is selected based on the combination of the user's 108 previous interactions with other devices (e.g. AI devices 110) and the type of information (i.e. private information) the user 108 is currently requesting using their user device 104. This process improves the information service system's 101 ability to enhance the user's 108 experience by providing the user 108 with information that is relevant to the user 108. This process also provides a better user experience and a technical improvement over systems that rely on using past information about a user 108 which may no longer be relevant or useful to the user 108. At step 416, the AI service engine 208 sends the selected subset of general information 222 to the user device 104 for the user 108.

FIG. 5 is a schematic diagram of an embodiment of an information processing flow 500 between an AI system 102 and the AI service engine 208. Process flow 500 may be used to identify classification tags for a user 108. An AI server 112 may obtain behavior information 218 for the user 108 from one or more AI devices 110. The AI server 112 transmits the obtained information to the information service system 101 for processing. The AI server 112 uses a communication interface 502 to send data 503 (e.g. behavior information 218) to the AI service engine 208. The communication interface 502 may be an Application Protocol Interface (API) or a BOT. A BOT may be an Internet bot or software application configured to run automated tasks or scripts over the Internet. The AI service engine 208 uses communication interface 504 to receive the data 503 from the AI system 102. Communication interface 504 may be an API or a BOT. In this configuration, the AI server 112 and the AI service engine 208 may be configured to communicate with each other using a BOT-to-BOT connection, a BOT-to-API connection, or an API-to-API connection.

In one embodiment, the AI service engine 208 begins processing the received data 503 by performing a statistical analysis (e.g. a regression analysis) on the data 503. The statistical analysis may provide information about correlations that exist within the data 503. After performing the statistical analysis, the data 503 is processed using a machine learning model or a neural network model 508 to classify the data 503. The AI service system 208 uses the machine learning model 508 to determine classification information 509 for the data 503 and associate a classification type with the data 503. For example, when data 503 is associated with music, the AI service engine 208 may associate the data 503 with a classification type of "music" or "entertainment." The AI service engine 208 may employ any suitable type of supervised or unsupervised machine learning model for processing the data 503.

After determining classification information 509 for the data 503, the AI service engine 208 performs an error analysis 510 on the classification information 509. The error analysis 510 is used to determine whether the data 503 was properly classified. When error analysis 510 determines that the data 503 was not properly classified, the AI service engine 208 reapplies a machine learning model 508 to obtain new classification information 509. The error analysis 510 may comprise any suitable type of error analysis as would be appreciated by one of ordinary skill in the art. When the error analysis 510 determines that the data 503 was properly classified, the AI service engine 208 outputs the data 503 and the classification information 509. For example, the data 503 and the classification information 509 may be sent to a memory (e.g. memory 204) or database for storage.

In other embodiments, the AI service engine 208 may process the data 503 using any other suitable combination of processing steps to determine classification information 509 associated with the data 503.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A communication system, comprising:
an artificial intelligence (AI) system comprising an AI device, wherein:
the AI system is configured to collect behavior information for a user from the AI device; and
the behavior information comprises information about the user's interactions with the AI device; and
an information service system in signal communication with the AI system, comprising:
a network interface configured to:
communicate with the AI system; and
communicate with a user device associated with the user, wherein the user device is a different device from the AI device;
a memory operable to store:
private information uniquely linked with the user, comprising account information for the user; and general information comprising information linked with one or more classification types, wherein the general information is not uniquely linked with the user;
a processor in signal communication with the network interface and the memory, comprising:
an authentication engine, configured to authenticate the AI system, wherein authenticating the AI system enables data transfers between the AI system and the information service system; and
an AI service engine, configured to:
receive behavior information for the user from the AI system;
determine a first classification type based on the content of the behavior information;
link the user with the first classification type;
receive a private information request from the user device associated with the user, wherein the private information request requests account information for the user;
determine a second classification type based on the private information request;
send the account information to the user device;
identify general information with a classification type that matches the first classification type of the user;
select a subset of the identified general information with a classification type that matches the second classification type; and
send the selected subset of general information to the user device.

2. The system of claim 1, wherein:
the memory is further operable to store:
a plurality of access tokens; and
system information for the AI system comprising system credentials; and
the authentication engine is further configured to:
receive an access token request from the AI system;
send an access token to the AI system;
receive a system access request comprising:
the access token; and
credentials for the AI system;
compare the received access token to the access token sent to the AI system;
compare the received system credentials to the stored system credentials;
determine that the AI system passes authentication when the received access token matches the access token sent to the AI system and the received system credentials matches the stored system credentials; and
send an authorization notification to an AI service engine in response to determining that the AI system passes authentication.

3. The system of claim 2, wherein:
the memory is further operable to store user credentials for the user;
the authentication engine is further configured to:
receive a service access request comprising user credentials for the user; and
authenticate the user based on the user credentials before sending the access token to the AI system, wherein authenticating the user comprises:
comparing the received user credentials to the stored user credentials; and
determining that the received user credentials match the stored user credentials.

4. The system of claim 1, wherein the network interface enables communications between the information service system and the AI system using an Application Protocol Interface (API)-to-API connection.

5. The system of claim 1, wherein the network interface enables communications between the information service system and the AI system using a BOT-to-Application Protocol Interface (API) connection.

6. The system of claim 1, wherein the network interface enables communications between the information service system and the AI system using a BOT-to-BOT connection.

7. The system of claim 1, wherein the general information comprises information linked with a group the user is associated with.

8. The system of claim 1, wherein authenticating the AI system enables unidirectional data transfers from the AI system to the information service system.

9. An information sharing method, comprising:
collecting, by an artificial intelligence (AI) system, behavior information for a user from an AI device, wherein the behavior information comprises information about the user's interactions with the AI device;
authenticating, by an authentication engine of an information service system, the AI system, wherein authenticating the AI system enable data transfers between the AI system and the information service system;
receiving, at a network interface of the information service system, behavior information for the user from the AI system;
determining, by an AI service engine of the information service system, a first classification type based on the content of the behavior information;
linking, by the AI service engine, the user with the first classification type;
receiving, at the network interface, a private information request from a user device associated with the user, wherein:
the user device is a different device from the AI device; and
the private information request requests account information for the user;
determining, by the AI service engine, a second classification type based on the private information request;
sending, by the AI service engine, the account information to the user device;
identifying, by the AI service engine, general information with a classification type that matches the first classification type of the user, wherein the general information is not uniquely linked with the user;
selecting, by the AI service engine, a subset of the identified general information with a classification type that matches the second classification type; and
sending, by the AI service engine, the selected subset of general information to the user device.

10. The method of claim 9, further comprising:
receiving, by the network interface, an access token request from the AI system;
sending, by the authentication engine, an access token to the AI system;
receiving, by the network interface, a system access request comprising:
the access token; and
credentials for the AI system;
comparing, by the authentication engine, the received access token to the access token sent to the AI system;

comparing, by the authentication engine, the received system credentials to previously stored system credentials;

determining, by the authentication engine, that the AI system passes authentication when the received access token matches the access token sent to the AI system and the received system credentials matches the previously stored system credentials; and sending, by the authentication engine, an authorization notification to an AI service engine in response to determining that the AI system passes authentication.

11. The method of claim 10, further comprising:

receiving, by the network interface, a service access request comprising user credentials for the user; and authenticating, by the authentication engine, the user based on the user credentials before sending the access token to the AI system, wherein authenticating the user comprises:

comparing the received user credentials to previously stored user credentials; and determining that the received user credentials match the previously stored user credentials.

12. The method of claim 9, wherein receiving behavior information for the user from the AI system comprises using an Application Protocol Interface (API)-to-API connection.

13. The method of claim 9, wherein receiving behavior information for the user from the AI system comprises using a BOT-to-Application Protocol Interface (API) connection.

14. The method of claim 9, wherein receiving behavior information for the user from the AI system comprises using a BOT-to-BOT connection.

15. The method of claim 9, wherein the general information comprises information linked with a group the user is associated with.

16. The method of claim 9, wherein authenticating the AI system enables unidirectional data transfers from the AI system to the information service system.

17. An information service system, comprising:

a network interface configured to:
communicate with an artificial intelligence (AI) system comprising an AI device; and
communicate with a user device associated with the user, wherein the user device is a different device from the AI device;

a memory operable to store:
private information uniquely linked with the user, comprising account information for the user; and
general information comprising information linked with one or more classification types, wherein the general information is not uniquely linked with the user;

a processor in signal communication with the network interface and the memory, comprising:
an authentication engine, configured to authenticate the AI system, wherein authenticating the AI system enables data transfers between the AI system and the information service system; and
an AI service engine, configured to:
receive behavior information for the user from the AI system, wherein the behavior information comprises information about the user's interactions with the AI device;
determine a first classification type based on the content of the behavior information;
link the user with the first classification type;
receive a private information request from the user device associated with the user, wherein the private information request requests account information for the user;
determine a second classification type based on the private information request;
send the account information to the user device;
identify general information with a classification type that matches the first classification type of the user;
select a subset of the identified general information with a classification type that matches the second classification type; and
send the selected subset of general information to the user device.

18. The system of claim 17, wherein:

the memory is further operable to store:
a plurality of access tokens; and
system information for the AI system comprising system credentials; and the authentication engine is further configured to:
receive an access token request from the AI system;
send an access token to the AI system;
receive a system access request comprising:
the access token; and
credentials for the AI system;
compare the received access token to the access token sent to the AI system;
compare the received system credentials to the stored system credentials;
determine that the AI system passes authentication when the received access token matches the access token sent to the AI system and the received system credentials matches the stored system credentials; and
send an authorization notification to an AI service engine in response to determining that the AI system passes authentication.

19. The system of claim 18, wherein:

the memory is further operable to store user credentials for the user;

the authentication engine is further configured to:
receive a service access request comprising user credentials for the user; and
authenticate the user based on the user credentials before sending the access token to the AI system, wherein authenticating the user comprises:
comparing the received user credentials to the stored user credentials; and
determining that the received user credentials match the stored user credentials.

20. The system of claim 17, wherein authenticating the AI system enables unidirectional data transfers from the AI system to the information service system.

* * * * *